United States Patent
Weinman, Jr.

(10) Patent No.: US 6,453,022 B1
(45) Date of Patent: Sep. 17, 2002

(54) MULTI-LINE TELEPHONE WITH INPUT/OUTPUT MIXING AND AUDIO CONTROL

(75) Inventor: Joseph B. Weinman, Jr., Basking Ridge, NJ (US)

(73) Assignee: AT&T Corporation, New York, NY (US)

(*) Notice: Subject to any disclaimer, the term of this patent is extended or adjusted under 35 U.S.C. 154(b) by 0 days.

(21) Appl. No.: 09/268,538

(22) Filed: Mar. 15, 1999

Related U.S. Application Data

(60) Provisional application No. 60/114,555, filed on Dec. 31, 1998.

(51) Int. Cl.$^7$ .......................... H04M 1/64; H04M 1/00; H04M 3/42
(52) U.S. Cl. ................ 379/88.13; 379/67.1; 379/88.17; 379/93.21; 379/158; 379/202.01; 379/205.01; 379/908
(58) Field of Search ........................ 379/88.13, 88.17, 379/88.18, 93.09, 93.21, 93.35, 142.08, 157, 158, 201.01, 202.01, 205.01, 207.01, 215.01, 900, 901, 908, 265.09

(56) References Cited

U.S. PATENT DOCUMENTS

| | | | |
|---|---|---|---|
| 4,479,195 A | 10/1984 | Herr et al. | 364/900 |
| 4,878,242 A | 10/1989 | Springer et al. | 379/204 |
| 5,195,086 A | 3/1993 | Baumgartner et al. | 370/62 |
| 5,255,264 A | 10/1993 | Cotton et al. | 370/24 |
| 5,440,624 A | 8/1995 | Schoof, II | 379/202 |
| 5,495,522 A | 2/1996 | Allen et al. | 379/202 |
| 5,533,112 A * | 7/1996 | Danneels | 379/202 |
| 5,539,741 A * | 7/1996 | Barraclough et al. | 370/62 |
| 5,644,626 A | 7/1997 | Carlsen et al. | 455/31.2 |
| 5,757,781 A | 5/1998 | Gilman et al. | 370/260 |
| 5,758,079 A | 5/1998 | Ludwig et al. | 395/200.34 |
| 5,778,053 A * | 7/1998 | Skarbo et al. | 379/93.21 |
| 5,802,294 A | 9/1998 | Ludwig et al. | 395/200.34 |
| 6,157,711 A * | 12/2000 | Katz | 379/365 |

* cited by examiner

Primary Examiner—Allan Hoosain
(74) Attorney, Agent, or Firm—Banner & Witcoff, Ltd.

(57) ABSTRACT

The present invention is a method and apparatus for selectively controlling the interconnectivity of two or more active telephone lines and/or one or more audio characteristics of each of the active telephone liens during a multi-line call. A bridge or a call connection control may be implemented to provide selective call connection for each active telephone call. The user may thereby control the interconnectivity of each party to the user and to the other parties to the conference or multi-line call. An audio controller may also be implemented within a multi-line telephone or at a telephony switch. The call connection control or the volume control may be implemented within the telephone network such as a switch or locally at the telephone unit. The user may provide the desired interconnectivity or volume parameters for the multi party call using a user interface. Optionally, the audio controller may process the audio signals of the conferenced telephone lines and intelligently adjust the audio characteristics of the audio signals.

26 Claims, 12 Drawing Sheets

MULTI-LINE TELEPHONE WITH INPUT/OUTPUT MIXING AND AUDIO CONTROL

This application claims the benefit of U.S. Provisional Application Ser. No. 60/114,555 filed on Dec. 31, 1998 for which priority is claimed. This provisional application is incorporated herewith by reference in its entirety.

BACKGROUND OF THE INVENTION

1. Technical Field

The present invention relates to telephone systems providing multiple party calling and more particularly to a multi-line calling telephone system capable of selectively controlling the interconnectivity and audio characteristics of each individual active telephone line.

2. Description of the Relevant Art

Conference and multi-person calling have become increasingly popular and common calling techniques for businesses as well as individual subscribers. These multi-line calling techniques allow multiple callers to be connected to each other thereby allowing the callers to communicate with each other. The user may couple two or more telephone lines such that the user and the parties associated with the respective telephone lines may communicate with each other in a conference call. Alternatively, the user may place multiple calls and communicate with each of the called parties without allowing the called parties to communicate with each other. A telephone party may be conferenced or simultaneously coupled to multiple parties within a multi-line telephone or even an ordinary telephone. In a multi-line telephone, a plurality of telephone lines may be coupled to a single multi-line telephone unit. The user may select the particular telephone line from which to place a call or the particular line to answer an incoming call; alternatively, the multi-line telephone may automatically select the lines.

The multiple party calling concept may also be implemented within multi-media communication systems. For example, U.S. Pat. No. 5,195,086 discloses a multiple call control method in a multimedia conferencing system where each call may comprise one or more channels. Such systems allow multiple parties to communicate over voice, video and data lines.

These conferencing and multi-line systems, however, are limiting in a variety of respects. For instance, these systems have a limited ability to control the interconnectivity between the parties in a multi-party call. As a result, these systems cannot handle a number of functions that the calling party may seek in a multi-line telephone system. For example, in the case where a calling party is conferenced with one or more conferenced parties, the calling party may seek to conference in a secret advisor to the call such that the secret advisor may hear the entire conversation, and advise the calling party without the secret advisor being heard by the other conferenced parties. Alternatively, if the calling party is on hold by the first called party, the calling party may seek to place other calls while on hold while not having the two calls conferenced together, yet continue to listen to the held call. The calling party may wish to independently monitor the line in which he/she is on hold while engaging in a discussion with the other called parties. In yet another example, the calling party may seek to make a plurality of non-conferenced calls and broadcast one or more messages, or simultaneously listen to all of the parties. Present systems are unable to provide the user with these and other such finer call control features that can greatly enhance the functionality of the system.

The conferencing and multi-line systems of the prior art are also limiting in that they are unable to control one or more audio characteristics of each individual line. Often, during a conference call, one party is calling through a bad telephone connection or the party is using a weak telephone receiver. This affects the conference call as this party is barely heard by the other parties to the conference call. Further, in the case of a half-duplex conferencing system, the party having the bad connection may not be able to interrupt when others are talking or even if there is background noise. Alternatively, where a party's line has a lot of noise (such as in the case where the party is using a cellular phone), it may be desirable to reduce the volume or noise level from that party. In other call conferencing situations, the user may desire that the volume of one line be different than that of another line and also to re-adjust the connection mode. For example, in the case where the user is on hold on a first line and that line is playing background music, the calling party may wish to decrease the volume of that line while he/she continues discussions with another conferenced party on a second line. When the party from the first line returns, the calling party may then wish to re-adjust the volume of the first line relative to the second line. Telephone sets generally have volume control but this control merely adjusts the overall volume output from the telephone speaker. Such telephone sets are incapable of selectively distinguishing between the telephone lines to control the relative volume of each individual line or other audio characteristics of the line such as noise, bass, treble, etc.

Consequently, there remains a need in the art to provide a multi-line telephone system capable of providing enhanced interconnectivity control and selective control of one or more audio characteristics for each of the active telephone lines.

SUMMARY OF THE INVENTION

The present invention is directed to solving these and other problems and disadvantages of the prior art. The present invention is a method and apparatus for selectively controlling the interconnectivity and one or more audio characteristics of one or more active telephone lines during a conference or multi-line call. A bridge or a call connection control may be implemented to provide selective call connection for each telephone call. The user may thereby control the interconnectivity of each party to the user and to the other parties to the conference or multi-line call. An audio controller may also be implemented within a multi-line telephone or at a telephony switch. The call connection control or the audio control may be implemented within the telephone network such as a switch or locally at the telephone unit. The user may provide the desired interconnectivity or audio parameters for the multi party call using a user interface. Optionally, the audio controller may process the audio signals of the conferenced telephone lines and intelligently adjust one or more audio characteristics of the audio signals.

Further details and features of the present invention may be understood from a careful reading of the detailed description thereof which follows.

DETAILED DESCRIPTION

Figure 1:
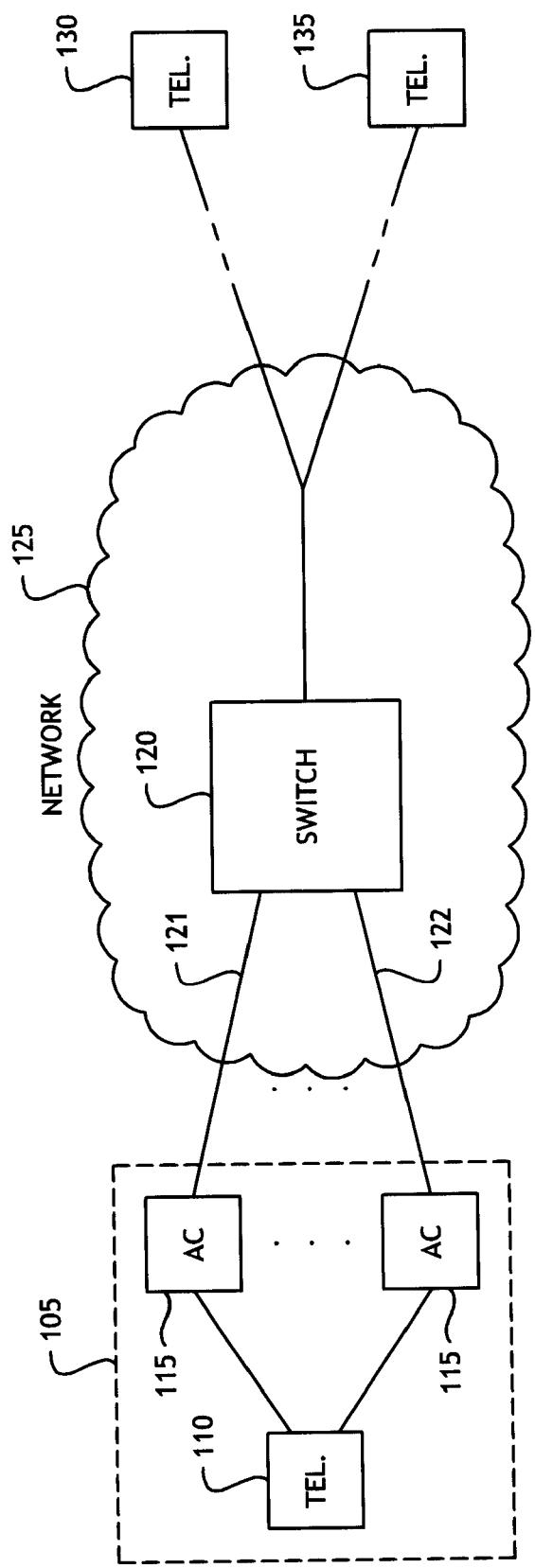
FIG. 1 is a schematic diagram of a multi-line telephone system in accordance with a preferred embodiment of the present invention as implemented within a communications network.

FIG. 1 is a schematic diagram of a multi-line telephone system 105 in accordance with a preferred embodiment of the present invention as implemented within a communications network. The multi-line telephone system 105 includes a multi-line telephone 110 coupled to one or more telephone lines 121 and 122. The multi-line telephone 110 may have two or more telephone lines which may be separate telephone lines or may be fewer lines that are multiplexed to provide functionality for a greater number of telephone lines. The multi-line telephone system further includes an audio controller 115 (discussed in further detail herein) for each of the telephone lines 121 and 122 associated with multi-line telephone 110. Multi-line telephone system 105 is coupled to a central office 120 of a standard public telephony network 125. Other or additional switching systems may be utilized to couple multi-line telephone 110 to network 125, including, but not limited to, a Private Branch Exchange (PBX). Multi-line telephone system 105 is capable of placing calls to or receiving calls from two or more calling parties at telephones 130 and 135 and conferencing the two or more calls. A conference call allows a user at multi-line telephone 110 and parties at telephone 130 and 135 to communicate with each other. Typically, the three conferenced parties communicate with each other by voice or audio signals. Multi-line telephone system 105 may be implemented within a multi-media system capable of audio, video and data communications. In this case, a conference call allows the conferenced parties to communicate by audio, video and data signals.

Advantageously, in accordance with this embodiment of the present invention, multi-line telephone system 105 includes one or more audio controllers 115 that allow the user to selectively adjust one or more characteristics of the audio signal received and transmitted by multi-line telephone 110 over one or more of the telephone lines 121 and 122. Audio controller 115 independently or collectively adjusts parameters of the incoming and outgoing signal of the telephone line associated with the particular audio controller 115. Audio controller 115 may take the form of any device including, but not limited to, electrical, mechanical, optical or any combination thereof for reducing or increasing the amplitude of the incoming voice signal delivered to multi-line telephone by that telephone line. For example, audio controller 115 may include an attenuator, an electrical filter and/or a multiplier. Audio controller 115 may control any number of audio characteristics including, for example and without limitation, peak volume, average volume, average dB, noise level, bass and treble. Those skilled in the art will appreciate that audio controller 115 may incorporate any number of techniques known in the art to adjust any of these and other audio characteristics.

Multi-line telephone system 105 may incorporate an audio controller 115 for each telephone line, as shown in FIG. 1, and/or may implement a single master audio controller 115 capable of controlling the voice signal amplitude of all associated telephone lines. Under the latter embodiment, single audio controller 115 may include a switch to select the telephone line for which to control.

Figure 2:
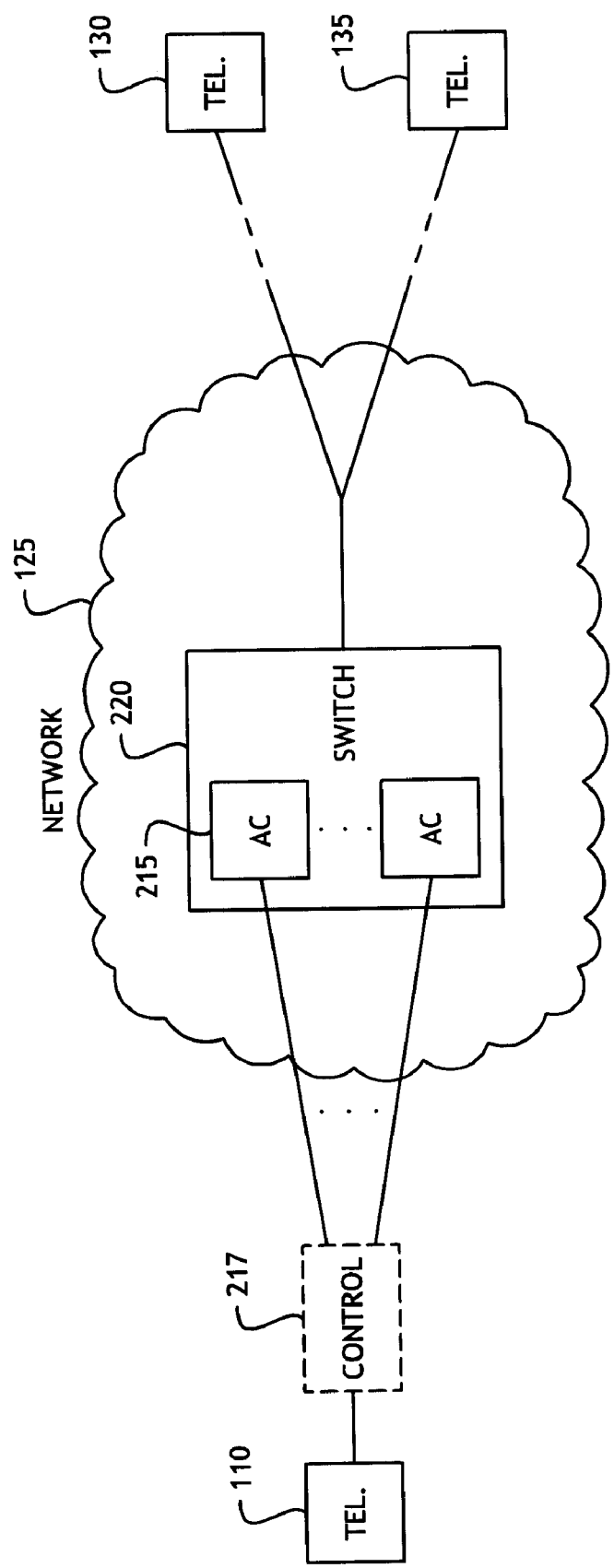
FIG. 2 is a schematic diagram of a multi-line telephone system implemented within a communications network in accordance with another preferred embodiment of the present invention.

FIG. 2 is a schematic diagram of a multi-line telephone system implemented within a communications network in accordance with another preferred embodiment of the present invention. Under this embodiment, a central office or switch 220 includes one or more audio controllers 215. Under this embodiment, audio controller 215 may be associated with an individual telephone line or may control audio signal amplitudes of a plurality of telephone lines. Audio controller 115 is preferably still controlled by the telephone customer. Advantageously, under this embodiment, a multi-line telephone having the hardware to practice the present invention would not be required, but rather a standard multi-line telephone would suffice. The audio characteristics of each telephone line may be controlled by the user providing control signals to switch 220. For example, the user may use the telephone keypad, or voice instructions, to provide instructions to increase or decrease the relative volume of any given telephone line. Alternatively, a local controller 217 having a user interface may be provided to generate control signals for audio controller 215. Local controller 217 may be a separate component coupled between multi-line telephone 110 and switch 220 and may optionally be installed within a customer's proprietary network. In yet another embodiment, local controller 217 may be part of multi-line telephone 110. ISDN, SS7, proprietary or any other signaling technique may be used to deliver control signals from multi-line telephone 110 or local controller 217 to audio controller 215 of switch 220.

Figure 3:
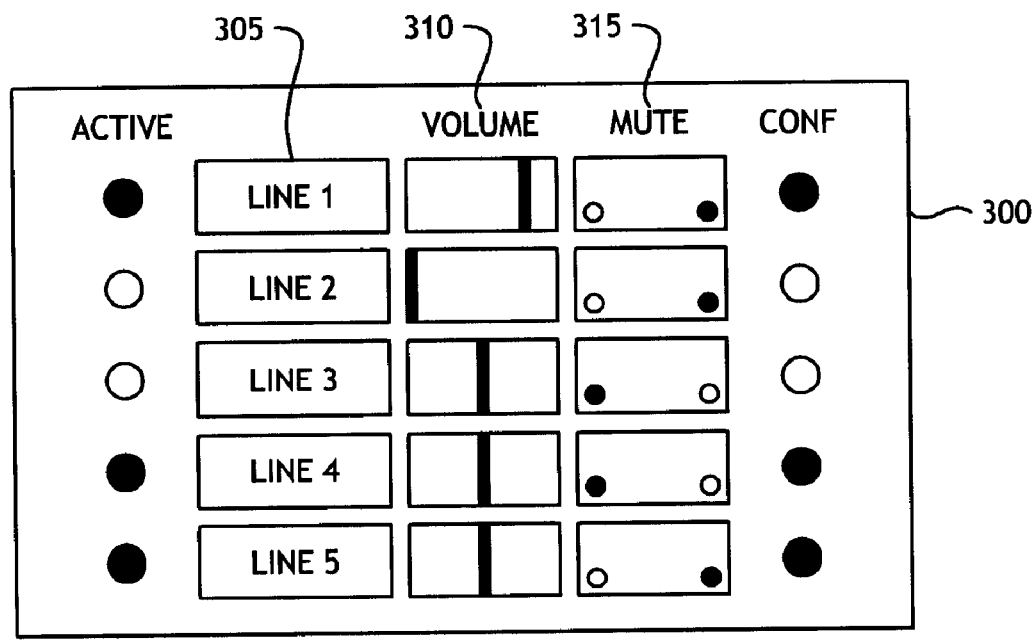
FIG. 3 shows a preferred embodiment of a user interface of a multi-line telephone system in accordance with the present invention.
Figure 4:
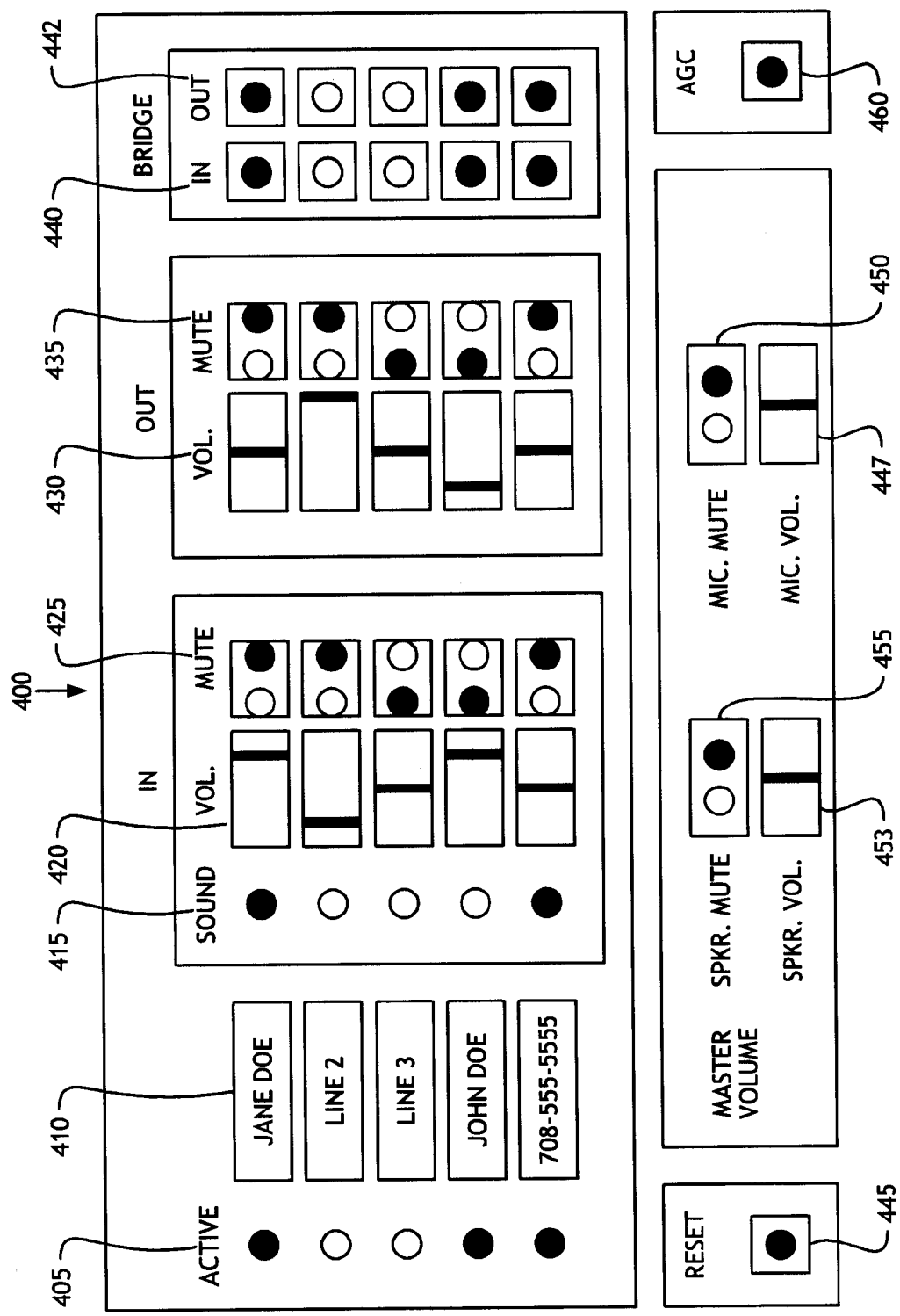
FIG. 4 shows another preferred embodiment of a user interface of a multi-line telephone system in accordance with the present invention.

FIG. 4 shows an exemplary user interface 400 of a multi-line telephone system in accordance with one preferred embodiment of the present invention. As shown in this figure, interface 400 is capable of connecting to five telephone lines and capable of selectively establishing the connectivity and/or audio characteristics of each line. Interface 400 illustrates a user interface for achieving the functionality of the present invention and includes a number of controls that are grouped in columns by functionality and in rows according to the telephone line. Interface 400 includes a telephone line column 410 indicating the telephone line. Telephone line column 410 may have a display for each telephone line to identify the party or telephone number associated with that line. Such a display may be utilized in conjunction with a callerID subscriber service such as is commonly available. An activity column 405 having a light emitting diode (LED)-type device in association with each telephone line may be used to indicate whether a particular telephone line is active. Interface 400 of FIG. 4 includes another group of columns to selectively monitor and control the signaling received by the user from each of the parties. A sound column 415 having a light emitting diode (LED)-type device in association with each telephone line may be used to indicate whether the party associated with that telephone line is speaking. Sound column 415 may also be a bar display and/or may have some memory capability to display historical sound characteristics, similar to the horizontal bar display that is found in audio equipment such as stereos. Advantageously, this memory capability allows the user to identify the telephone line from which an audio signal originated in case the user happened to look away from the user interface while the audio signal was being delivered. This feature also allows the user to identify the source of the audio signal in the event that the user is monitoring a plurality of telephone lines. An input audio signal column 420 similar to that of FIG. 3 (discussed below) may be used to selectively adjust the audio characteristic(s) of each of the incoming telephone lines. Audio control is preferably implemented with an electronic control system such that the reset functionality (discussed herein) may be utilized. Further, an input mute column 425 is shown to prevent the signaling from any of the incoming callers from being received by the user. The user may mute a party by depressing the mute button corresponding to the party. When a muted party is talking the sound indicator of sound column 415 would light up such that the user is informed that the muted party is speaking. The user may then start receiving signaling from the muted party by depressing again the mute button corresponding to the muted party.

Interface 400 also includes another group of columns to selectively control the output signaling to each of the parties. An output mute column 435 is provided to selectively prevent any signaling to be sent to the corresponding party to the telephone call. Similarly, an output audio signal column 430 selectively adjusts the audio parameters of the signaling to be delivered to the corresponding party.

A bridge input column 440 is utilized to allow the user to control whether the output of the corresponding party is delivered to the user via a bridge. If a bridge is not used (preferably the default), the output signal from the corresponding party may be delivered directly to the user. Otherwise, the output signal is delivered to the bridge which combines the signal with the other received signals. A bridge output column 442 is utilized to control whether the output from the bridge is to be delivered to the corresponding party. If the bridge is not used, the signal from the user is delivered directly to the corresponding party. Otherwise, the corresponding party receives the output signal from the bridge. As preferred, the user may simultaneously engage in a bridged call as well as a non-bridged call. Bridging is discussed in further detail below. User interface 400 also includes a group of interfaces to control various overall parameters of the telephone call. A reset button 445 may be utilized to reset the parameters adjusted in columns 415–435 and buttons 450–460 to their respective default values. Interface also includes a group of master controls. A master speaker mute control 455 and speaker volume control 453 may be utilized to mute or adjust the volume of the overall signal output from the telephone speaker. Further, a master microphone mute control 450 and microphone volume control 447 may be utilized to mute or adjust the volume of the overall signal output from the telephone to each of the parties to the call. Advantageously, the user may mute or adjust volume without interrupting the settings of each telephone line. An automatic gain control (AGC) 460 may be utilized to automatically adjust the relative volumes of each of the incoming and outgoing signals.

It is appreciated that any number of user interfaces may be utilized to practice the present invention. For example, in the case where more than one bridge is implemented, a user interface in the form of a matrix may be implemented identifying the telephone lines associated with each bridge. The columns may represent each bridge and the rows may reflect the telephone lines. Other variations of the matrix may exist such as for example, where the columns represent input lines and the rows represent output lines. Alternatively, the user interface may allow the user to select the bridge to display as to which lines are coupled to that bridge.

Figure 5:
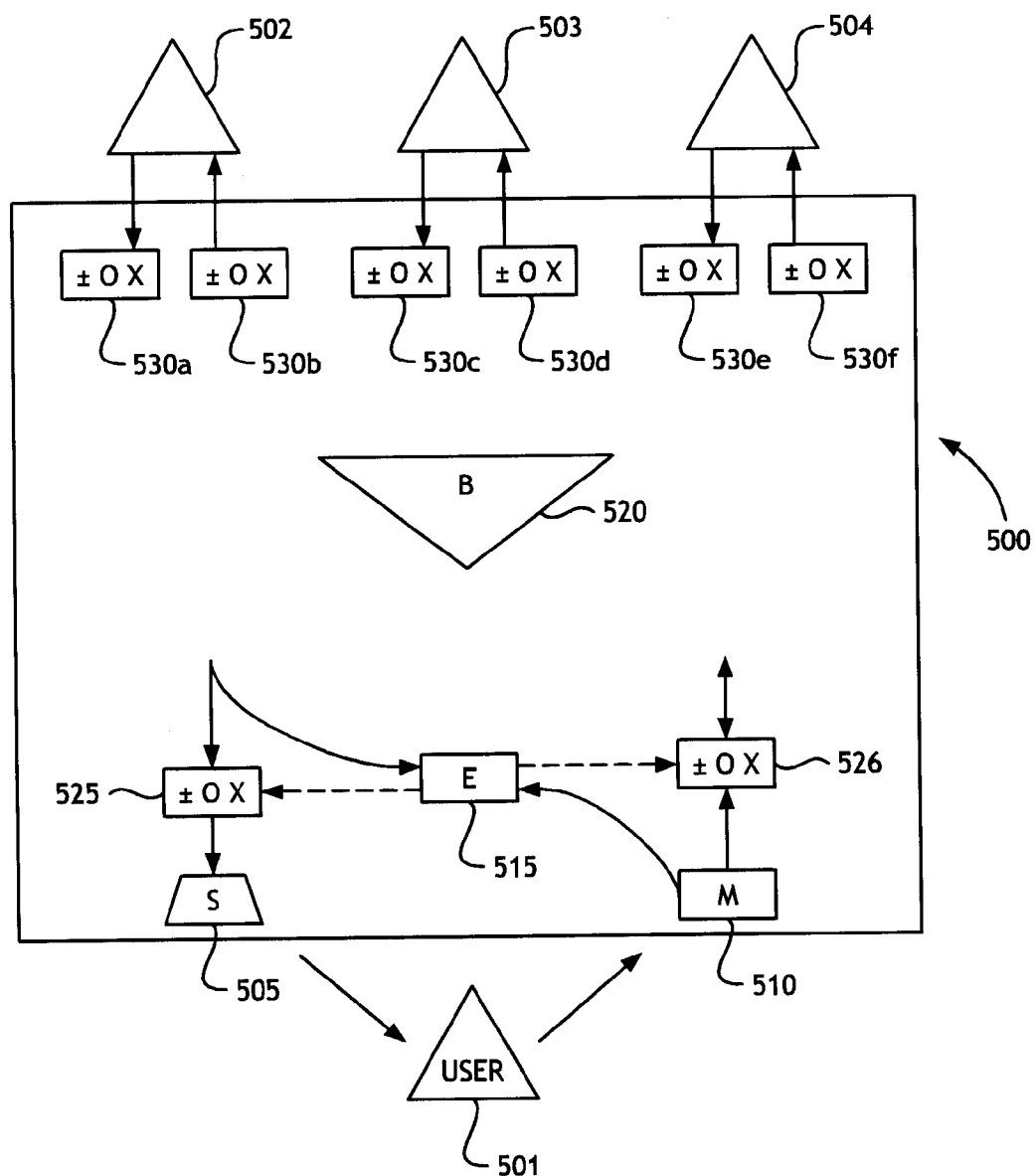
FIG. 5 is a schematic block diagram of a telephone system in accordance with the present invention.

Advantageously, this embodiment of FIG. 4 provides the user with interconnectivity control for each active telephone line of a multi-line call. The features of this embodiment of the present invention may be conceptualized by FIG. 5, which is a schematic illustration of an overall telephone system connecting a user and one or more calling parties. Telephone system 500 couples a user 501 to one or more parties 502–504. The system 500 has a speaker 505 and microphone 510 coupled to user 501 and controlled by master audio controllers 525 and 526 (elements 447–455 of FIG. 4) respectively. Controller 525 mixes all lines of bridged calls and/or non-bridged calls. Controller 526 distributes the audio output to the bridges and/or to each of the non-bridged calls. An echo feedback canceler 515 is preferably coupled to audio controllers 525 and 526 and microphone 510 to cancel out any unwanted echoes and feedback. Bridge 520 couples the user 501 to parties 502–504 over telephone system 500. Party 502 is coupled to input audio controller 530a (elements 420 and 425 of FIG. 4) and output audio controller 530b (elements 430 and 435 of FIG. 4) which may disconnect (X), mute (O), attenuate (−), amplify (+) (shown in Figure as ∓O X), or otherwise process audio characteristics of the signal in accordance with the user's settings. Each other party 503 and 504 is coupled to system 500 in a similar manner. A bridge 520 is utilized to conference parties 502–504 selectively among each other and/or to user 501. Input signals to bridge 520 are combined into a single output signal to provide selective conferencing between parties 502–504 selectively among each other and/or user 501. Bridge 520 may be part of the telephone unit, a switch and/or a third party proprietary device. Presently available hardware may be utilized to implement the features and functions of bridge 520. User 501 may selectively establish the type of connection with parties 502–504. Particularly, signals from parties 502–504 may be directly delivered to user 501 or may be delivered via bridge 520. Similarly, signals to parties 502–504 may be directly delivered to parties 502–504 or may be delivered via bridge 520.

Figure 6:
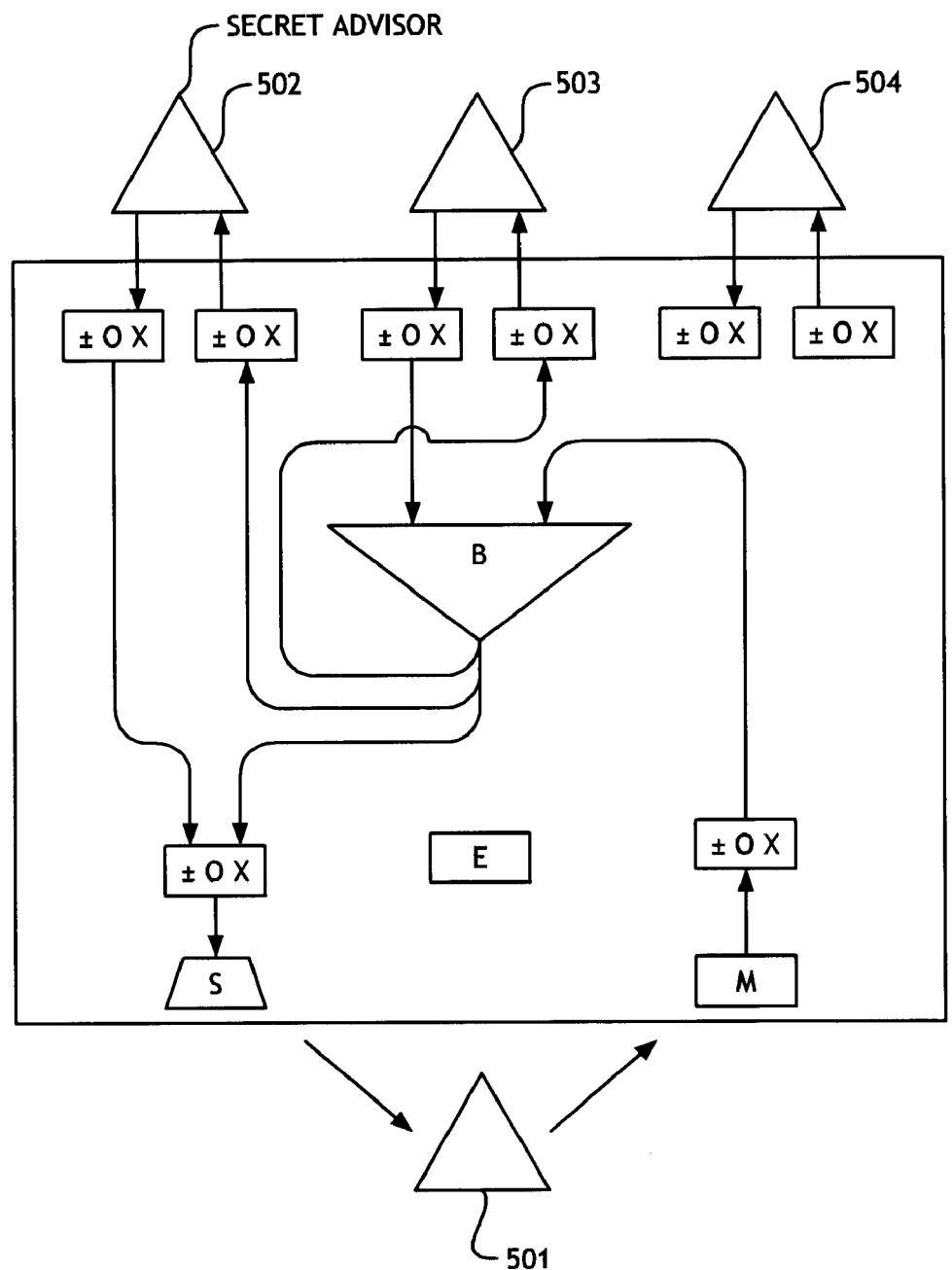
FIGS. 6–12 are illustrations of exemplary multi-line call connections that may be made in accordance with the present invention.
Figure 7:
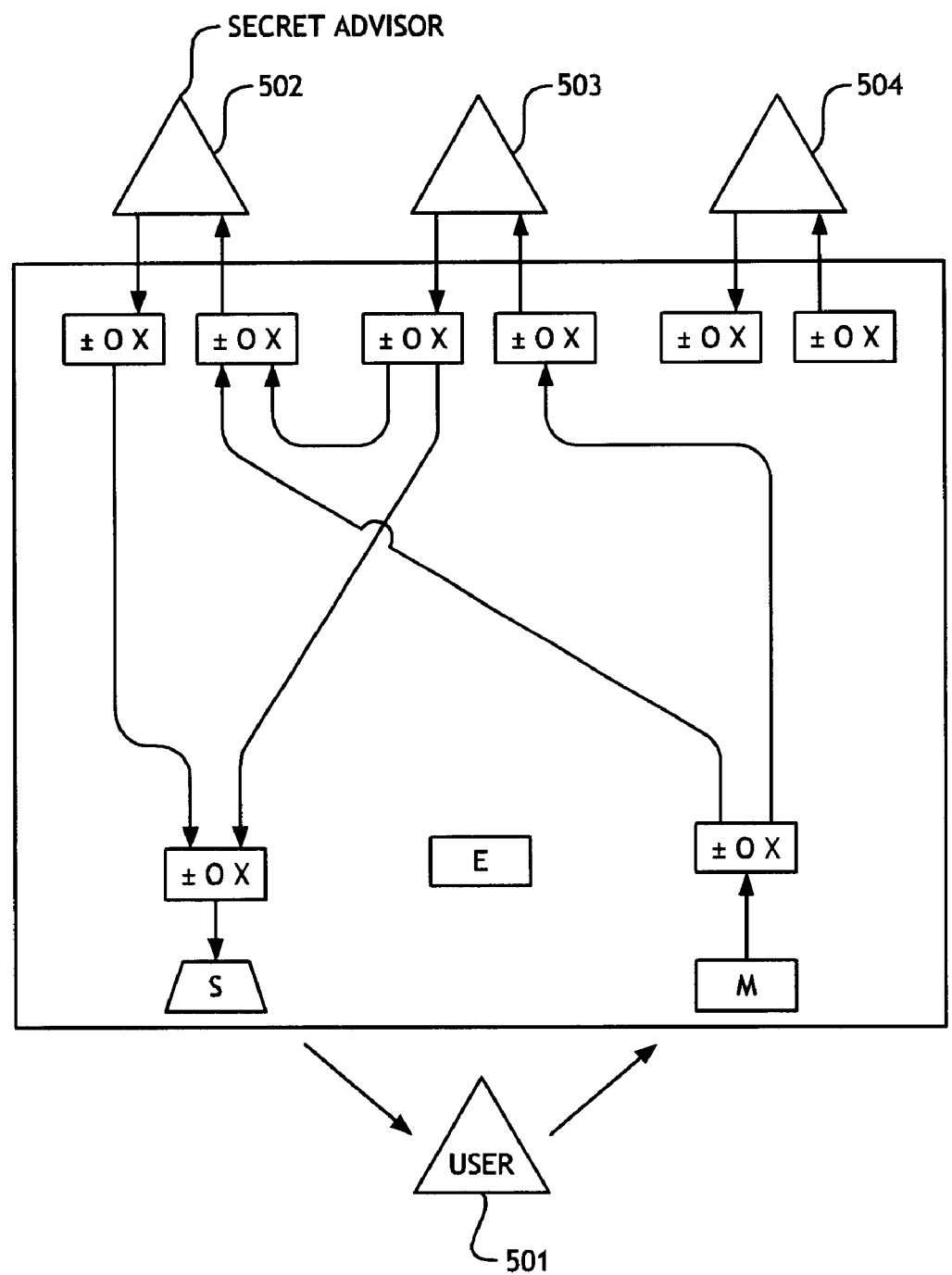
Figure 8:
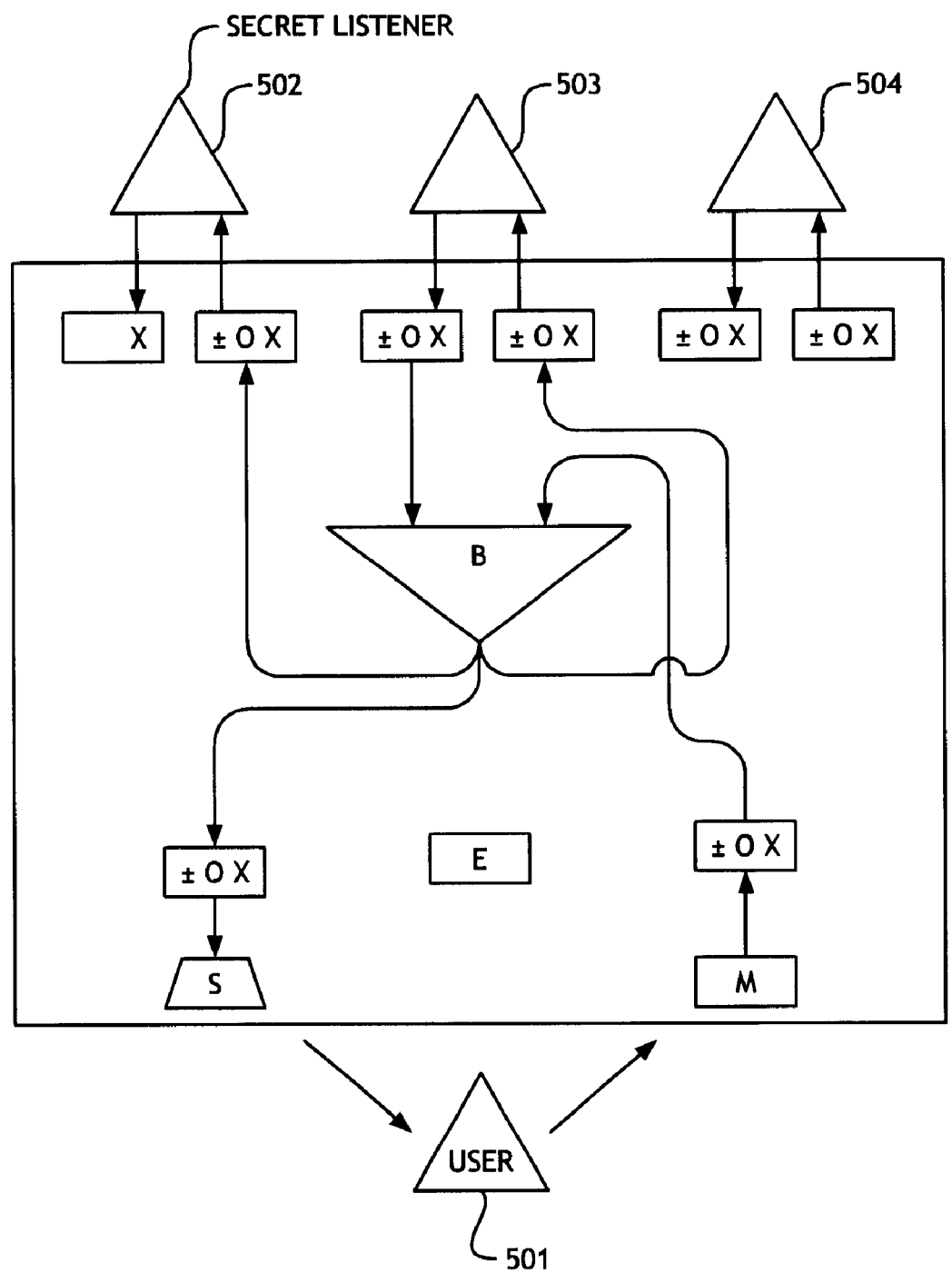
Figure 9:
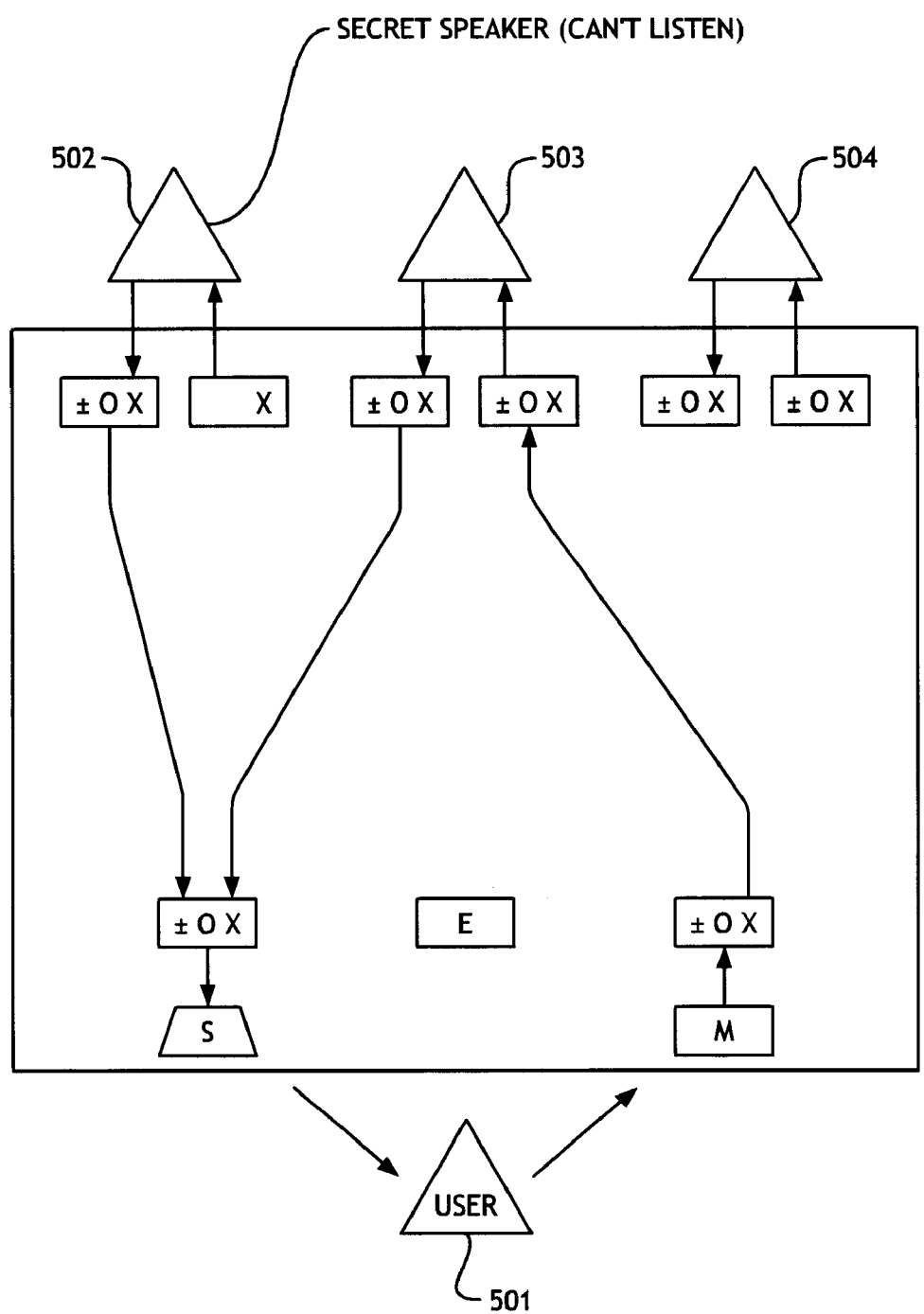
Figure 10:
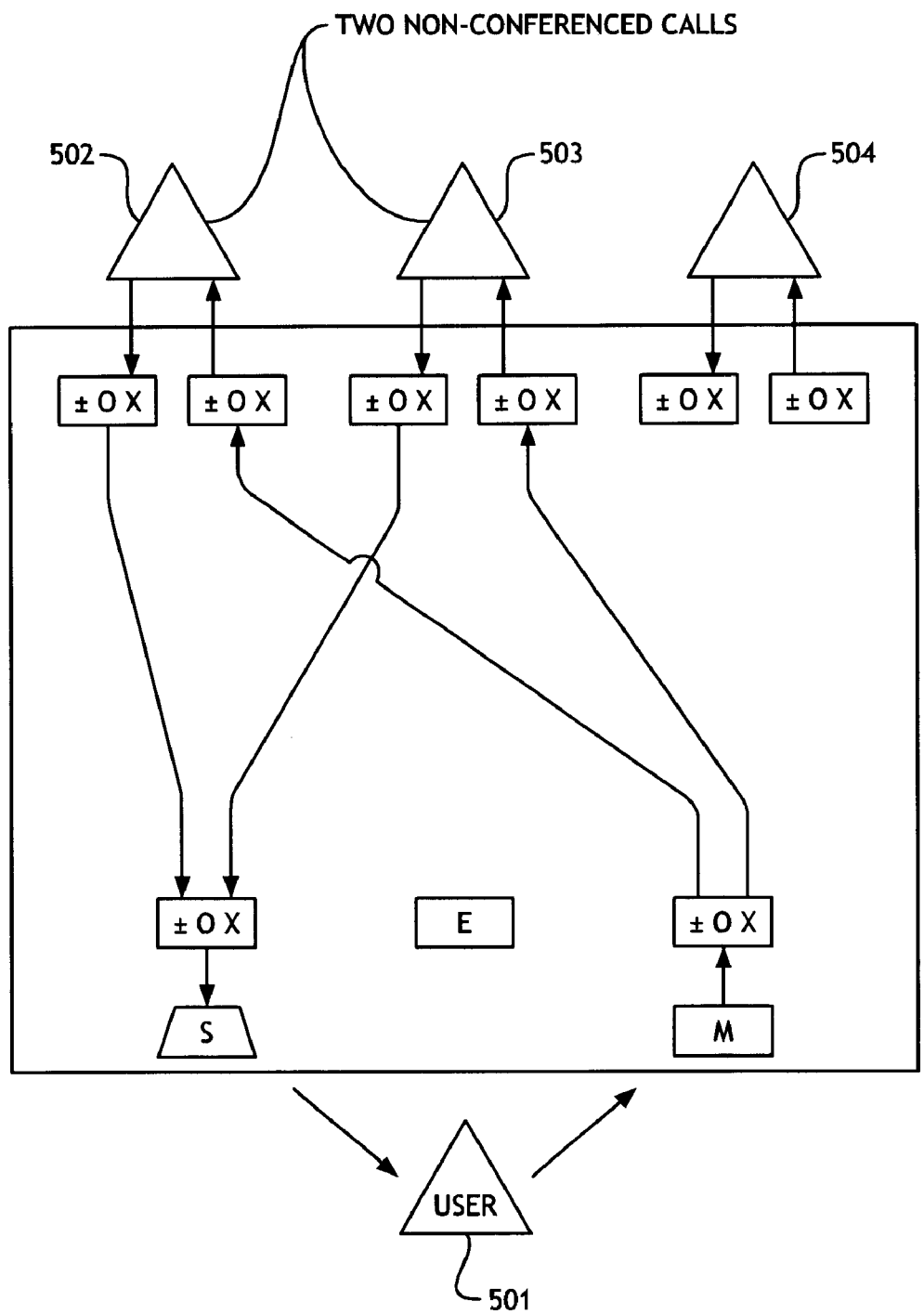
Figure 11:
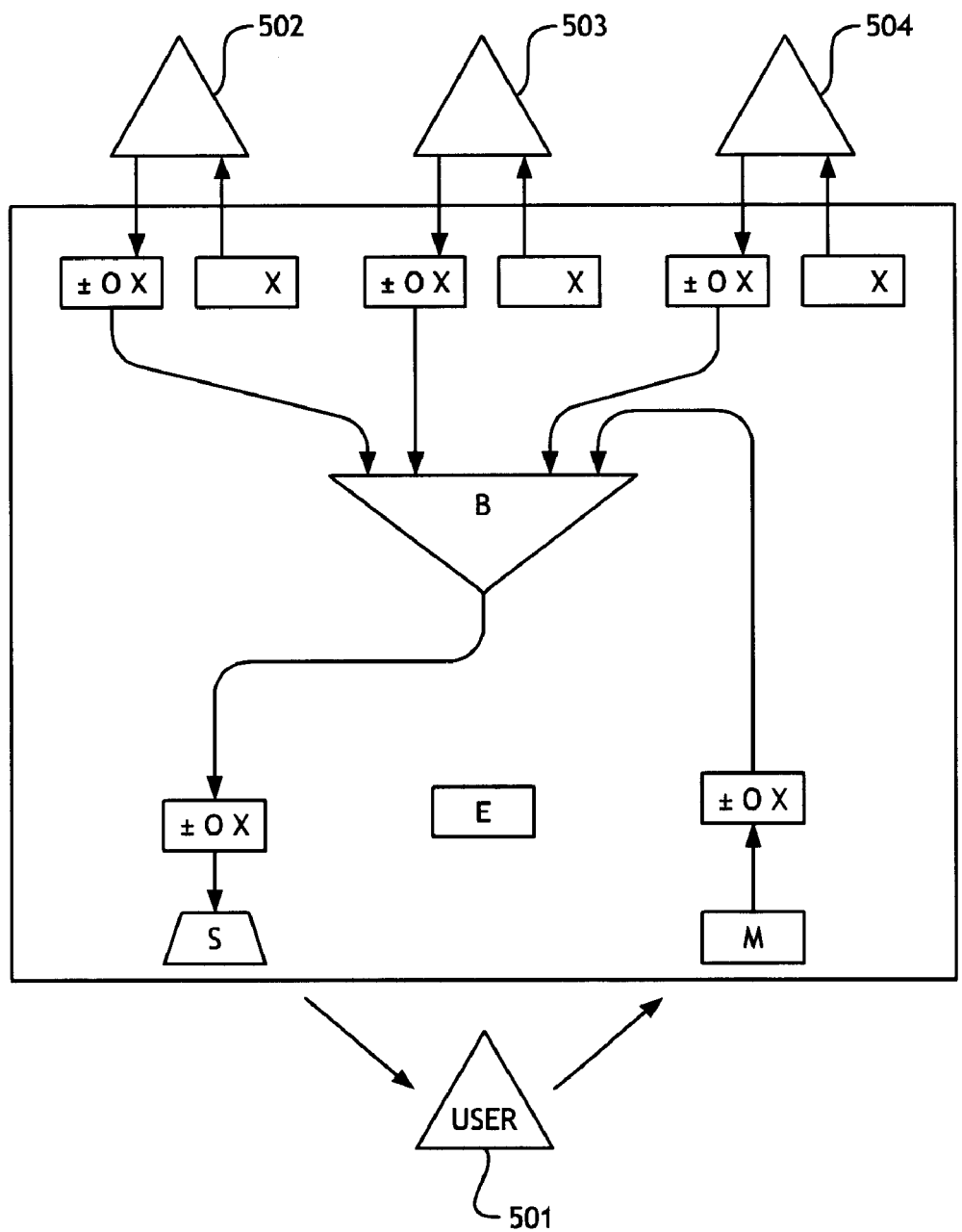
Figure 12:
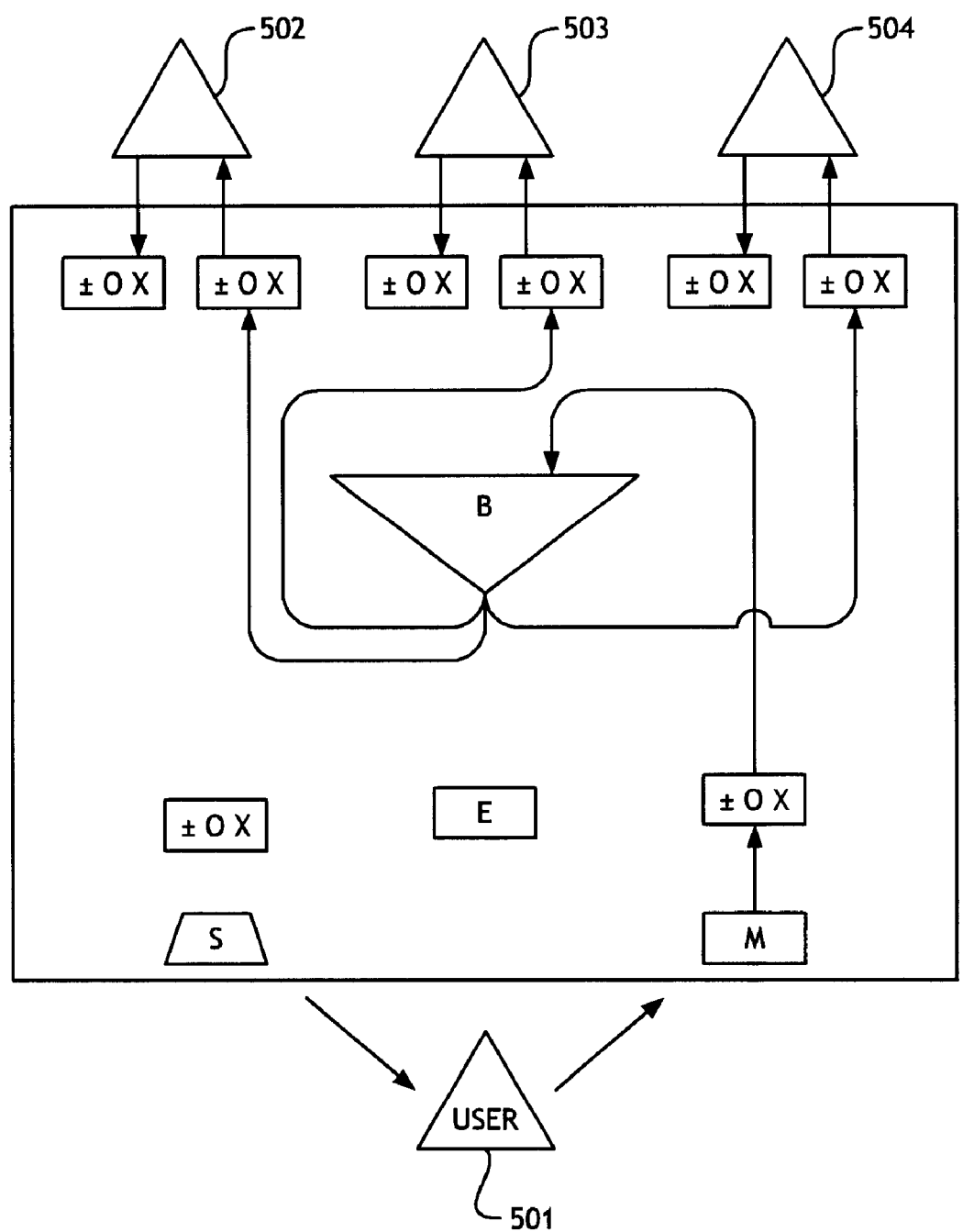

User 501 may thereby selectively control various call parameters for each of the called parties using interface 400 of FIG. 4. These call parameters include, but are not limited to, input audio control for each telephone line, output audio control for each telephone line, overall volume control, mute control for each telephone line, and connection control between one telephone line and the other telephone lines. FIG. 6 illustrates one example where party 502 is a secret advisor capable of listening to the conversation between party 503 and user 501. Party 502 may also speak to only user 501. This situation may be implemented by coupling the output and input of party 503 to bridge 520. Signaling from party 502 is directly delivered to user 501. Signaling to party 502 is delivered from bridge 520. User 501 is coupled to receive signals from bridge 520 and directly from party 502. Output signals from user 501 are delivered to bridge 520. Party 502 may thereby privately listen to the conversation between user 501 and party 503 and concurrently still speak to user 501 during the call. This call situation may also be established without bridge 520 as shown in FIG. 7. As shown in FIG. 8, party 502 may also be coupled such that it is only privately listening to the conversation between user 501 and party 503. Similarly, as shown in FIG. 9, party 502 may also be coupled such that it is only speaking to user 501 while user 501 is engaged in a call with party 503. As shown in FIG. 10, user 501 may have two simultaneous, non-conferenced calls to parties 502 and 503, known as a dispatcher-type function. FIG. 11 shows an example where user 501 may monitor a plurality of parties 502–504. FIG. 12 is an example where user 501 may broadcast a message to a plurality of parties 502–504. These call situations are merely examples of the numerous types of call arrangements that may be established with the present invention. The bridge may also be implemented within a connection controller which may be in the form of a microprocessor to provide the control of the connection parameters to each of the parties as discussed herein. Other hardware and/or software means may also be implemented to perform the functions of the bridge.

FIG. 3 shows another exemplary user interface 300 of a multi-line telephone system in accordance with another preferred embodiment of the present invention. As shown, this user interface 300 is capable of connecting to five telephone lines. User interface 300 may be implemented within the multi-line telephone itself or as a separate component coupling the telephone lines with the multi-line telephone. User interface 300 includes a row of controls for each telephone line coupled to the telephone. Each row includes a line selection button 305, an audio control 310, and a mute button 315. Line selection button 305 preferably allows the user to select which lines are to be conferenced. In accordance with the present invention, audio control 310 allows the user to selectively adjust the audio signal parameters received by the corresponding telephone line. Mute button 315 allows the user to mute the telephone line so that the associated calling party does not receive any voice signals. Those skilled in the art will appreciate that any number of user interfaces could be implemented and are meant to be within the spirit and scope of the present invention. For example, in the implementation of a multimedia conferencing system (such as that disclosed in U.S. Pat. No. 5,195, 086), the user-interface may be in the form of a Windows-based Graphical User Interface (GUI).

In yet another embodiment, audio controller 115 of 215 (of FIGS. 1 or 2) may be an intelligent controller capable of automatically adjusting the relative audio characteristics of the conferenced lines. In this embodiment, intelligent audio controller 115 or 215 may include a digital signal processor (DSP), a microprocessor or other circuitry appropriate to monitor the voice signals of each active line for background noise or music. Audio signal parameters of the telephone lines could thereby be adjusted to compensate for the unwanted noise. Additionally, or in the alternative, intelligent audio controller 115 or 215 may monitor the voice signals of each active telephone line to compare various audio characteristics. Intelligent audio controller 115 or 215 may thereby automatically adjust the audio signal parameters of each telephone lines such that the voice signals have relatively similar audio characteristics as perceived by the human ear.

Those skilled in the art will appreciate that the present invention may be implemented within any variety of communications systems where voice signaling is utilized. For example, the present invention may be implemented within any multi-media conferencing system to selectively control the voice signal amplitude of each of the conferenced callers. An example of such a multi-media system may be that disclosed in U.S. Pat. No. 5,195,086 entitled "Multiple Call Control Method in a Multimedia Conferencing System" and assigned to AT&T Bell Laboratories, incorporated herein by reference.

The present invention is provided by way of description of one embodiment. The principles of the invention may be extended to provide selective control of voice signals for any number of telecommunications related services such as Internet services, television/video/data conferencing services and the like. The present invention may also be implemented within a private, local and/or long distance communications network. The scope of the invention should only be deemed limited by the claims which follow.

What I claim is:

1. A communications system coupled to a telephony network comprising:

(a) means for coupling at least two telephone calls to a telephone system; each of the telephone calls transmitting signals to the telephone system, the signals from each of the telephone calls having a corresponding audio characteristic;

(b) means for receiving call connection information from the telephone system for each telephone call, wherein the call connection information for each telephone call is selected from the group consisting of input audio control, output audio control, connection control from the first active telephone call to the second active telephone call, and connection control from the second active telephone call to the first active telephone call; and (c) at least one controller associated with each of the telephone calls capable of selectively adjusting a call connection parameter of at least two of the telephone calls in response to the control information.

2. The communications system of claim 1, wherein the multi-line telephone system is part of a multimedia system and at least one telephone call transmits video signals.

3. The communications system of claim 1, wherein the multi-line telephone system is part of a multimedia system and at least one telephone call transmits video and data signals.

4. The communications system of claim 1, wherein the telephone system has a user interface to allow a user to selectively control the call connection information for at least two of the telephone call.

5. The communications system of claim 1, wherein the input and output audio controls provide control of audio characteristics selected from the group consisting of peak volume, average volume, noise level, bass and treble.

6. A communications system coupled to a telephony network comprising:

(a) means for coupling at least two telephone calls to a telephone system, each of the telephone calls transmitting signals to the telephone system, the signals from each of the telephone calls having a corresponding audio characteristic, wherein the audio characteristic is selected from the group consisting of peak volume, average volume, noise level, bass and treble;

(b) means for receiving audio characteristic control information from the telephone system; and (c) at least one audio controller coupled to at least one of the telephone calls capable of selectively adjusting the audio characteristic of the signal associated with at least one of the telephone calls in response to the audio characteristic control information.

7. The communications system of claim 6, wherein the audio controller is an intelligent audio controller.

8. The communications system of claim 7, wherein the intelligent audio controller includes a microprocessor coupled to receive and process the signals and wherein the intelligent audio controller may responsively adjust the audio characteristic of the signal associated with at least one of the telephone calls.

9. The communications system of claim 6, wherein the telephone system has a user interface to allow a user to selectively control the audio characteristic of the signal from each of the telephone calls.

10. A communications system coupled to a telephony network comprising:
(a) a coupler that connects at least two telephone calls to a telephone system; each of the telephone calls transmitting signals to the telephone system, the signals from each of the telephone calls having a corresponding audio characteristic;
(b) a receiver that detects call connection information from the telephone system for each telephone call, wherein the call connection information for each telephone call is selected from the group consisting of input audio control, output audio control, connection control from a first active telephone call to a second active telephone call, and connection control from the second active telephone call to the first active telephone call; and
(c) at least one controller associated with each of the telephone calls capable of selectively adjusting at least one call connection parameter of at least one of the telephone calls in response to the control information.

11. The communications system of claim 10, wherein the telephone system is part of a multimedia system and the at least one telephone call transmits video signals.

12. The communications system of claim 10, wherein the telephone system is part of a multimedia system and the at least one telephone call transmits video and data signals.

13. The communications system of claim 10, wherein the telephone system has a user interface to allow a user to selectively control the call connection information for the at least one of the telephone calls.

14. The communications system of claim 10, wherein the input and output audio controls provide control of audio characteristics selected from the group consisting of peak volume, average volume, noise level, bass and treble.

15. A communications system coupled to a telephony network comprising:
(a) a coupler that connects at least two telephone calls to a telephone system, each of the telephone calls transmitting signals to the telephone system, the signals from each of the telephone calls having a corresponding audio characteristic, wherein the audio characteristic is selected from the group consisting of peak volume, average volume, noise level, bass and treble;
(b) a receiver that detects audio characteristic control information from the telephone system; and
(c) at least one audio controller coupled to at least one of the telephone calls capable of selectively adjusting the audio characteristic of the signal associated with at least one of the telephone calls in response to the audio characteristic control information.

16. The communications system of claim 15, wherein the audio controller is an intelligent audio controller.

17. The communications system of claim 16, wherein the intelligent audio controller includes a microprocessor coupled to receive and process the signals and wherein the intelligent audio controller may responsively adjust the audio characteristic of the signal associated with the at least one of the telephone calls.

18. The communications system of claim 15, wherein the telephone system has a user interface to allow a user to selectively control the audio characteristic of the signal from each of the telephone calls.

19. A method for selectively controlling a telephone call, the method comprising the steps of:
(a) coupling at least two telephone calls to a telephone system; each of the telephone calls transmitting signals to the telephone system, the signals from each of the telephone calls having a corresponding audio characteristic;
(b) receiving call connect ion information from the telephone system for each telephone call, wherein the call connection information for each telephone call is selected from the group consisting of input audio control, output audio control, connection control from a first active telephone call to a second active telephone call, and connection control from the second active telephone call to the first active telephone call; and
(c) selectively adjusting at least one call connection parameter of at least one of the telephone calls in response to the control information.

20. The method of claim 19, further comprising the step of:
receiving information from a user interface to allow a user to selectively control the call information for the at least one of the telephone calls.

21. The method claim 19, wherein the input and output audio controls provide control of audio characteristics selected from the group consisting of peak volume, average volume, noise level, bass and treble.

22. The method of claim 19, wherein step (a) comprises the steps of:
connecting to a first call, wherein the first call is associated with a video signal; and
joining the first call to a second call.

23. The method of claim 19, wherein step (a) comprises the steps of:
connecting to a first call, wherein the first call is associated with a video signal and a data signal; and
joining the first call to a second call.

24. A method for selectively controlling a telephone call, the method comprising the steps of:
(a) coupling at least two telephone calls to a telephone system, each of the telephone calls transmitting signals to the telephone system, the signals from each of the telephone calls having a corresponding audio characteristic, wherein the audio characteristic is selected from the group consisting of peak volume, average volume, noise level, bass and treble;
(b) receiving audio characteristic control information from the telephone system; and
(c) selectively adjusting the audio characteristic of the signal associated with at least one telephone call in response to the audio characteristic control information.

25. The method of claim 24, wherein step (c) comprises the steps of:
selectively adjusting the audio characteristic of a received signal associated with the at least one telephone call; and
selectively adjusting the audio characteristic of a transmitted signal associated with the at least one telephone call.

26. The method of claim 24, further comprising the step of:
receiving information from a user interface to allow a user to selectively control the audio characteristic of the signal from each of the telephone calls.

* * * * *